(12) United States Patent
Shimakura et al.

(10) Patent No.: US 6,475,300 B2
(45) Date of Patent: *Nov. 5, 2002

(54) NON-CHROMATE METALLIC SURFACE-TREATING AGENT, METHOD FOR SURFACE TREATMENT, AND TREATED STEEL MATERIAL

(75) Inventors: Toshiaki Shimakura, Frankfurt am Main (DE); Motohiro Sasaki, Kawasaki (JP); Katsuyoshi Yamasoe, Sakura (JP); Hiromasa Nomura, Kimizu (JP); Hiroshi Kanai, Kimizu (JP); Kouhei Ueda, Chiba (JP)

(73) Assignee: Nippon Paint Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/793,710

(22) Filed: Feb. 27, 2001

(65) Prior Publication Data

US 2001/0042491 A1 Nov. 22, 2001

(30) Foreign Application Priority Data

Feb. 29, 2000 (JP) ........................................ 2000-052994
Aug. 10, 2000 (JP) ........................................ 2000-243049

(51) Int. Cl.$^7$ .......................... C23C 22/07; C23C 27/50; C23C 22/53; C23C 22/68; C23C 28/00
(52) U.S. Cl. .................. 148/247; 106/14.41; 106/14.42; 106/14.44; 148/243; 427/328; 427/387; 427/409; 427/419.2; 428/472.1
(58) Field of Search .......................... 106/14.21, 14.44, 106/14.41, 14.42; 148/243, 247; 427/328, 387, 409, 419.2; 428/472.1

(56) References Cited

U.S. PATENT DOCUMENTS

| | | | | |
|---|---|---|---|---|
| 5,969,019 A | * | 10/1999 | Kanai et al. | 427/372.2 |
| 6,180,177 B1 | * | 1/2001 | Nagashima et al. | 427/388.4 |
| 6,241,830 B1 | * | 6/2001 | Shimakura et al. | 106/14.12 |
| 6,309,477 B1 | * | 10/2001 | Shimakura et al. | 106/14.12 |

* cited by examiner

Primary Examiner—Anthony J. Green
(74) Attorney, Agent, or Firm—Sughrue Mion, PLLC

(57) ABSTRACT

A non-chromate metallic surface treating agent comprising (a) a silane coupling agent and/or a hydrolytic condensation product thereof, (b) water-dispersible silica, and (c) a zirconium compound and/or a titanium compound, and further comprising (d) a thiocarbonyl-containing compound and/or (e) a water-soluble acrylic resin is disclosed.

8 Claims, No Drawings

NON-CHROMATE METALLIC
SURFACE-TREATING AGENT, METHOD
FOR SURFACE TREATMENT, AND
TREATED STEEL MATERIAL

FIELD OF THE INVENTION

The present, invention relates to a metal surface-treating agent for such steel substrates as cold-rolled steel, hot-rolled steel, stainless steel, electroplated zinc-coated steel, hot-dip zinc coated-steel, zinc-aluminum alloy-coated steel, zinc-iron alloy-coated steel, zinc-magnesium alloy-coated steel, zinc-aluminum-magnesium alloy-coated steel, aluminum-coated steel, aluminum-silicon alloy-coated steel, tin-coated steel, lead-tin alloy coated steel, and chromium-coated steel, a surface-treating method, a method of producing coated steel materials further having top coatings on the treated surfaces, and coated steel products as produced by the method.

PRIOR ART

As the metallic surface treating agent, a chromium-containing surface-treating agent such as a chromate system or a phosphate-chromate system has heretofore been used broadly and still in use today. However, in view of the recent trend toward more stringent regulatory control for environmental protection, it is likely that the use of such coating systems will be restricted for fear of the toxicity, particularly carcinogenicity, of chromium. Therefore, development of a metallic surface-treating agent not containing chromium and yet as effective as the chromating agent in imparting adhesion and corrosion resistance has been awaited.

As disclosed in Japanese Patent Hei-11-29724, the inventors of the present invention previously developed a non-chromate rust-preventive agent comprising a water-based resin and, as incorporated therein, a thiocarbonyl group containing compound, a phosphate ion, and water-dispersible silica. Regrettably, however, this system was found to be inadequate for the above application which requires stringent processability and adhesion, although it provides good corrosion resistance. Meanwhile, with regard to silane coupling agents, an acidic surface-treating agent containing two dissimilar silane coupling agents is disclosed in Japanese Kokai Publication Hei-8-73775. However, this system is quite deficient in corrosion resistance for use in applications where high corrosion resistance and good processability are required after metallic surface treatment as in the present invention.

Moreover, Japanese Kokai Publication Hei-10-60315 discloses a steel structure surface-treating agent containing a silane coupling agent having a certain functional group reactive with a water-based emulsion but the corrosion resistance required here is only that of a degree satisfying comparatively mild test requirements such as those of a wet test and as far as corrosion-resistance is concerned, the system is a far cry from the rust inhibitor meeting the highly critical corrosion resistance requirements as provided by the present invention. With the foregoing state of the art by way of background, there has been a standing demand for development of a metallic surface-treating agent expressing sufficient corrosion resistance and processing adhesion at thin coating thicknesses.

SUMMARY OF THE INVENTION

The present invention has for its object to provide a nonchromate metallic surface-treating agent which is suited for metallic substrates, particularly metal-coated steel materials, and despite the absence of chromium therein, is capable of imparting high processability and corrosion resistance in preparation for a coating or other procedure.

The nonchromate metallic surface-treating agent according to the present invention comprises, in each liter thereof,
(a) 0.01 to 100 g/l of a silane coupling agent and/or a hydrolytic condensation product thereof,
(b) 0.05 to 100 g/l of water-dispersible silica (as solids), and
(c) 0.01 to 50 g/l, in terms of Zr ion, of a zirconium compound and/or 0.01 to 50 g/l, in terms of Ti ion, of a titanium compound and/or
(d) 0.01 to 100 g/l of a thiocarbonyl-containing compound and/or
(e) 0.1 to 100 g/l of a water-soluble acrylic resin.

The nonchroinate metallic surface-treating agent according to the present invention may comprise 0.01 to 100 g/l of phosphate ion.

The method of treating a metallic surface according to the present invention comprises treating the surface of a steel material or a metal-coated steel material with the above metallic surface-treating agent and said method is most suited for the surface treatment of zinc-coated steel material.

The surface-treated steel material and surface-treated metal-coated steel material according to the invention can be obtained by the above-method with-said metallic surface-treating agent.

The method of producing a coated steel material according to the present invention comprises treating the surface of a metal-coated steel material with said metallic surface-treating agent and, then, applying a top coat thereon.

The coated steel material of the present invention is obtainable by the above method using said metallic surface-treating agent.

DETAILED DESCRIPTION OF THE INVENTION

As the silane compound as one of its essential components, the metallic surface-treating agent of the present invention comprises a silane coupling agent and/or a hydrolytic condensation product thereof. The hydrolytic condensation product of a silane coupling agent means an oligomer obtainable by hydrolytic polymerization of the silane coupling agent.

The silane coupling agent which can be used as above in the present invention is not particularly restricted but includes the following, among others: vinylmethoxysilane, vinyltrimethoxysilane, vinylethoxysilane, vinyltrimethoxysilane, 3-aminopropyltriethoxysi.lane, 3-glycidoxypropyltrimethoxysilane, 3-methacryloxypropyltrimethoxysilane, 3-mercaptopropyltrimethoxysilane, N-(1,3-dimethylbutylidene)-3-(triethoxysilyl) -1-propanamine, N,N'-bis[3-(trimethoxysilyl)propyl]ethylenediamine, N-(β-aminoethyl)-γ-aminopropylmethyldimethoxysilane, N (β-aminoethyl)-γ-aminopropyltrimethoxysilane, γ-aminopropyltrimethoxysilane, γ-aminopropyltriethoxysilane, γ-glycidoxypropyltrimethoxysilane, γ-glycidoxypropyltriethoxysilane, γ-glycidoxypropylmethyldimethoxysilane, 2-(3,4-epQxycyclohexyl) ethyltrimethoxysilane, γ-methacryloxypropyltrimethoxysilane, γ-methacryloxypropyltriethoxysilane, γ-mercaptopropyltrimethoxysilane, γ-mercaptopropyltriethoxysilane and N-[2-(vinylbenzylaminolethyl]-3-aminopropyltrimethoxysilane.

The particularly preferred silane coupling agent includes vinylmethoxysilane, vinylethoxysilane, 3-aminopropyltriethoxysilane, 3-glycidoxypropyl-trimethoxysilane, 3-methacryloxypropyltriinethoxysilane, 3-mercaptopropyltriinethoxysilane, N-(1,3-dimethylbutylidene)-3-(triethoxysilyl)-1-propanamine and N,N'-bis[3-(trimethoxysilyl)propyl]ethylenediamine. These silane coupling agents can be used each alone or in a suitable combination.

In the present invention, said silane compound is formulated in a concentration of 0.01 to 100 g/l, preferably 0.05 to 25 g/l, in each liter of the metallic surface-treating agent. If the concentration of the silane compound is less than 0.01 g/l, the corrosion resistance-improving effect as well as the effect of improving adhesion to the nonchromate primer will be insufficient, while the use of the silane compound in excess of 100 g/l will result in saturation of the effect of addition and be uneconomical.

The metallic surface-treating agent of the present invention comprises water-dispersible silica. The water-dispersible silica which can be used is not particularly restricted but is preferably spherical silica, chainlike silica or aluminum-modified silica, which is lean in sodium and other impurities and weakly basic. The spherical silica includes colloidal silica such as "Snowtex N", "Snowtex UP" (both manufactured by Nissan Chemical) and fumed silica such as "Aerosil" (Japan Aerosil); the chainlike silica includes silica gel such as "Snowtex PS" (Nissan Chemical); and the aluminum-modified silica includes "Adelite AT-20A" (Asahi Denka), all of which are commercially available.

The above water-dispersible silica is formulated in a concentration of 0.05 to 100 g/l, preferably 0.5 to 60 g/l, in each liter of the metallic surface-treating agent on a solid basis. If the concentration of water-dispersible silica is less than 0.05 g/l, the corrosion resistance-improving effect will be insufficient, while the use of silica in excess of 100 g/l will not be rewarded with any further improvement in corrosion resistance but rather detract from the bath stability of the metallic surface-treating agent.

The metallic surface-treating agent of the present invention further comprises a zirconium compound and/or a titanium compound. The zirconium compound includes zirconyl ammonium carbonate, zirconium hydrofluoride, ammonium zirconium fluoride, potassium zirconium fluoride, sodium zirconium fluoride, zirconium acetylacetonate, zirconium butoxide-1-butanol solution, zirconium n-propoxide and so on. The titanium compound includes titanium hydrofluoride, ammonium titanium fluoride, potassium titanium oxalate, titanium isopropoxide, isopropyl titanate, titanium ethoxide, titanium 2-ethyl-1-hexanolate, tetraisopropyl titanate, tetra-n-butyl titanate, potassium titanium fluoride, sodium titanium fluoride and so on. These compounds may be used alone or in a suitable combination.

The above-mentioned zirconium compound and/or titanium compound is formulated, in each liter of the metallic surface-treating agent, in a concentration of 0.01 to 50 g/l, preferably 0.05 to 5 g/l, in terms of zirconium ion or titanium ion. If the concentration of the above compound is less than 0.01 g/l, corrosion resistance will become insufficient. If it exceeds 50 g/l no improvement will be realized inprocessing adhesion and, in addition, the-bath stability will be rather sacrificed.

The metal surface-treating agent according to the invention comprises a thiocarbonyl group-containing compound and/or a water-soluble acrylic resin. The thiocarbonyl group-containing compound may be a compound having at least one thiocarbonyl group, thus including thiourea, dimethylthiourea, 1,3-dimethylthiourea, dipropylthiourea, dibutylthiourea, 1,3-diphenyl-2-thiourea, 2,2-ditolylthiourea, thioacetamide, sodium dimethyldithiocarbamate, tetramethylthiuram monosulfide, tetrabutylthiuram disulfide, zinc N-ethyl-N-phenyldithiocarbamate, zinc dimethyldithiocarbamate, pentamethylenedithiocarbamic acid piperidine salt, zinc diethyldithiocarbamate, sodium diethyldithiocarbamate, zinc isopropylxanthate, ethylenethiourea, dimethylxanthogen disulfide, dithiooxamide, polydithiocarbamic acid or it salt, and so on. These compoundstcan be used each independently or two or more of them may be used in a suitable combination.

The thiocarbonyl-containing compound mentioned above is formulated in a concentration of 0.01 to 100 g/L, preferably 0.1 to 10 g/L. If the concentration of the above compound is less than 0.01 g/L, the corrosion resistance will be insufficient, while the concentration in excess of 100 g/L will result in uneconomical use because of the saturation of corrosion resistance-improving effect.

The water-soluble acrylic resin is a copolymer based on acrylic acid and/or methacrylic acid and includes their copolymers with methyl acrylate, ethyl acrylate, methyl methacrylate, ethyl methacrylate, etc. inclusive of derivatives thereof, and other acrylic monomers. It is particularly preferable that acrylic acid and/or methacrylic acid account for not less than 70% of the total monomer constituting a copolymer. The acrylic resin is formulated in a concentration of 0.1 to 100 g/L in each liter of the metal surface-treating agent of the invention. When the concentration of the acrylic resin is less than 0.1 g/L, the bend adhesion and deep drawability cannot be sufficiently improved. On the other hand, the Concentration exceeding 100 g/L is uneconomical because of the saturation of improvement effect on bend adhesion and deep drawability.

The molecular weight of the acrylic resin is preferably not less than 10,000 on a weight average basis. The more preferred range is 300,000 to 2,000,000. Exceeding 2,000,000 will results in an excessively high viscosity to adversely affect workability.

The metallic surface-treating agent of the present invention may be supplemented with phosphate ion to thereby improve corrosion resistance.

The above addition of a phosphate ion can be made by adding a compound capable of forming a phosphate ion in water. As such compounds, there can be mentioned phosphoric acid; salts of phosphoric acid which are represented by $Na_3PO_4$, $Na_2HPO_4$ and $NaH_2PO_4$; and condensed phosphoric acid compounds such as condensed phosphoric acid, polyphosphoric acid, metaphosphoric acid, pyrophosphoric acid, ultraphosphoric acid, etc. and salts thereof. These compounds can be used alone or in a suitable combination.

The above phosphate ion is formulated in a concentration of 0.01 to 100 g/l, preferably 0.1 to 10 g/l per each liter of the metallic surface-treating agent. If the concentration is less than 0.01 g/l, the corrosion resistance-improving effect will be insufficient. On the other hand, exceeding 100 g/l is objectionable because the zinc type-coated steel materials will be over-etched to cause a degradation of performance or, when a water-based resin is contained as an additional component, it will cause gelation.

The metallic surface-treating agent of the present invention may further comprise other components. As such other components, there can be mentioned tannic acid inclusive of its salt, phytic acid inclusive of its salt, and water-based resin. The water-based resin which can be used includes urethane resin, epoxy resin, ethylene-acrylic copolymer, phenolic resin, polyester resin, polyolefin resin, alkyd resin and polycarbonate resin, among others. These water-based resins can be used each independently or in a suitable combination. When a water-based resin is used, an organic solvent may be used concomitantly for improving its film-forming properties to thereby provide a more uniform, smooth film. Furthermore, a leveling agent, a wetting agent and a antifoaming agent may also be used.

The metallic surface-treating agent of the present invention can be used as a surface treating agent for such steel substrates as cold-rolled steel, hot-rolled steel, stainless steel, electroplated zinc-coated steel, hot-dip zinc coated steel, zinc-aluminum alloy-coated-steel, zinc-iron alloy-coated steel, zinc-magnesium alloy-coated steel, zinc-aluminum-magnesium alloy-coated steel, aluminum-coated steel, aluminum-silicon alloy-coated steel, tin-coated steel, lead-tin alloy coated steel, chromium-coated steel; Ni-coated steel; etc., with particularly beneficial effects in the case of metal-precbated steel materials. The method of using this surface-treating agent, that is to say the method of treating a steel material surface, may comprise applying said metallic surface-treating agent to a substrate metallic surface and drying the coat or comprise heating such a substrate in advance, applying the metallic surface-treating agent of the invention and allowing the coat to dry by utilizing the residual heat of the substrate.

In both cases, the above drying procedure can be carried out at room temperature to 250° C. for 2 seconds to 5 minutes. If the limit of 250° C. is exceeded, adhesion and corrosion resistance will be adversely affected. Preferred conditions are 40~180° C.×5 seconds ~2 minutes.

In the method of treating a metallic surface according to the present invention, the amount of deposition of said metallic surface-treating agent is preferably not less than 0.1 mg/m$^2$ on a dry film basis. If the coverage is less than 0.1 mg/m$^2$, the rust-preventive effect will be insufficient. On the other hand, if the coverage is excessive, it will be uneconomical as a pretreatment for coating. Therefore, the more preferred coverage is 0.5 to 500 mq/m$^2$, particularly 1 to 250 mg/m$^2$.

In practicing the method of treating a metallic surface according to the present invention, the mode of use of said metallic surface-treating agent is not particularly restricted. Thus, the routine techniques such as roller coating, shower coating, spray-coating, dipping and brush coating can be selectively employed. The optimum steel substrate includes metal-coated steel materials, particularly various plated steel materials.

The method of producing a coated steel material according to the present invention comprises treating a metallic surface with said metallic surface-treating agent, drying the coat, and applying a top coat. The top coat may for example be a top coat formed after the application and drying of a nonchromate primer or a functional coat formed for imparting such a function as fingerprint resistance or lubricity.

The above production technology can be applied not only to precoated steel materials but also to postcoated steel materials, and the "coated steel material" as referred to in this specification includes both types of steel materials. Furthermore, the term "steel material" is used herein to mean any and all steel materials inclusive of steel sheets and plates.

The nonchromate primer which can be used may be any primer not containing a chromate type rust-preventive pigment in its formulation. The primer preferably contains a vanadate type rust-preventive pigment or a phosphate type rust-preventive pigment (V/P pigment primer), or preferably uses a calcium silicate type rust-preventive pigment.

The coating amount of said primer is preferably equivalent to adry thickness of 1 to 20 μm. If the dry thickness is less than 1 μm, corrosion resistance will be insufficient. If the thickness exceeds 20 μm, processing adhesion will not be sacrificed.

The baking conditions for said nonchromate primer may be 150 to 250° C., in terms of metal surface temperature, and a baking time of 10 seconds ~5 minutes.

The top coating is not particularly restricted but may be any of the conventional top coatings.

The functional coating is not particularly restricted, either, but includes all kinds of coatings which are in use on chromate-pretreated surfaces.

The coating technology for said nonchromate primer, said top coat and said functional coat is not particularly restricted but includes roller coating, shower coating, air-spray coating, airless-spray coating and dip coating, among others.

The nonchromate metallic surface-treating agent according to the invention comprises a silane coupling agent and/or a hydrolytic condensation product thereof, a water-dispersible silica, a zirconium compound arid/or a titanium compound, and a thiocarbonyl-containing compound and/or a water-soluble acrylic resin. This metallic surface-treating agent is suit ed to the treatment of metals, particularly plated steel materials, and is capable of imparting excellent processability and corrosion resistance to the substrates for coating without enlisting the help of chromium.

Furthermore, by applying the metallic surface-treating agent of the invention to a process for producing nonchromate coated steel materials, the steel materials can be provided with processability, deep drawability and corrosion resistance equivalent or even superior to those of the conventional steel materials obtainable by using a chromate-containing rust-preventive agent.

The above advantages seem to come forth from the fact that since the metallic surface-treating agent of the present invention comprises a silane coupling agent, the reactive moiety of the silane coupling agent is firmly bound to the substrate metal surface through metasiloxane bonding and the organic moiety of the hydrophobic group is firmly bound to the organic film thereon to improve adhesion and thereby contribute to increased corrosion resistance. Moreover, particles of the water-dispersible silica are adsorbed and oriented on the substrate surface to act as a barrier against corrosive ions and moisture and thereby suppress corrosion, while the silanol group present on the silica surface enhances the adhesion between the organic film formed thereon and the metal surface. As to the zirconium ion, the formation of a zirconium oxide film on the metal surface-enhances corrosion resistance and, at the same time; the zirconium acts as a crosslinking agent for the film deposited thereon to increase the crosslinking density of the organic film to thereby further contribute to corrosion resistance, adhesion and coin scratch resistance. It is also considered that the thiocarbonyl-containing compound and the phosphate ion are readily adsorbed on the metal surface to cause a passivation of the metal surface and, moreover, their concurrent presence produces a synergistic effect leading to a marked improvement in corrosion resistance.

It is likely that as the acrylic resin acts as a binder for inorganic components such as dispersible silica, zirconium and the like, it contributes to improvements in the adhesion of the processed part and in deep drawability.

The coated steel material obtained in accordance with the present invention has excellent processability and corrosion resistance and, as such, finds application in a broad field of uses, such as household electrical appliances, computer-related devices, architectural members, and automotive and other industrial products.

EXAMPLES

The following examples are intended to describe the present invention in further detail and should by no means be construed as defining the scope of the invention.

Example 1

To 1 L of pure water was added 2.5 g of "Sila-Ace S-330"(γ-aminopropyltriethoxysilane; Chisso Corporation), and the mixture was stirred at room temperature for 5 minutes. Then, 1.0 g of "Snowtex N" (water-dispersible silica; Nissan Chemical) was further added and the mixture was stirred for 5 minutes. In addition, 2.5 g, in terms of Zr ion, of "Zircosol AC-7" (zirconyl ammonium carbonate; Daiichi Rare Elements Co.) was added. Then, 5.0 g of thiourea and 1.25 g, in terms of phosphate ion, of ammonium phosphate were further added and the mixture was stirred for 5 minutes to give a nonchromate metallic surface-treating agent. This metallic surface-treating agent was degreased with an alkaline cleaner (Surf Cleaner 155; Nippon Paint) and, using a #3 bar coater, applied onto a dried commercial zinc hot-dip galvanized'steel plate (Nippon Test Panel Co.; 70×150×0.4 mm) in a dry film thickness equivalent to 20 mg/$m^2$. After drying at a metal surface temperature of 60° C., a V/P pigment-containing nonchromate primer was applied in a dry film thickness of 5 μm using a #16 bar coater and dried at a metal surface temperature of 215° C. Further, using a #36 bar coater, Flexicoat 1060 (a polyester top coating; Nippon Paint) was applied. in a dry film thickness of 15 μm as a top coat anddriedat ametal surface temperature of 230° C. To prepare a testpiece. The bending adhesion, corrosion resistance and coin scratch resistance of the testpiece were evaluated by the methods to be described hereinafter and the results were shown in Table 1.

Examples 2 to 22 and Comparative Examples 1 and 2

Except that the silane coupling agent, water-dispersible silica, zirconium compound, thiocarbonyl-containing compound and water-soluble acrylic resin were varied in kind and concentration and the phosphate ion was varied in concentration as shown in Table 1, the procedure of Example 1 was otherwise followed to prepare metallic surface-treating agents. Using these metallic surface-treating agents, testpieces were prepared in the same manner as in Example 1. These testpiedes and the metallic surface-treating agents were evaluated by the same methods as above. The results are shown in Table 1.

Comparative Example 3

Except that a commercial chromating agent for coating use (resin-containing type), in lieu of the metallic surface-treating agent of the invention, was applied at a chromium deposition rate of 20 mg/$m^2$ and dried and that a chromate-containing primer (a primer containing a strontium chromate pigment) was used, the procedure of Example 1 was otherwise followed to prepare a testpiece. The results of evaluation are shown in Table 1.

TABLE 1

| | | | | | | | | | | | | | | | | | |
|---|---|---|---|---|---|---|---|---|---|---|---|---|---|---|---|---|---|
| | | \multicolumn{12}{c}{Metal surface treating agent formulation} | | | | | |
| | No. | Coupling agent Kind | Coupling agent g/l | Silica Kind | Silica g/l | Zr compound Kind | Zr compound g/l | Thiocarbonyl compound Kind | Thiocarbonyl compound g/l | Acrylic resin Kind | Acrylic resin g/l | $PO_4$ g/l | Bending adhesion Primary | Bending adhesion Secondary | Deep drawability | Corrosion resistance cut | Corrosion resistance End face | Coin scratch resistance |

| Group | No. | Coupling Kind | Coupling g/l | Silica Kind | Silica g/l | Zr Kind | Zr g/l | Thio Kind | Thio g/l | Acrylic Kind | Acrylic g/l | $PO_4$ g/l | Bend Pri | Bend Sec | Deep draw | Corr cut | Corr End | Coin scratch |
|---|---|---|---|---|---|---|---|---|---|---|---|---|---|---|---|---|---|---|
| Example | 1 | 1 | 2.5 | 1 | 1 | 1 | 2.5 | 1 | 5 | — | — | 1.25 | 5 | 5 | 2 | 5 | 5 | 4 |
| | 2 | 2 | 5 | 1 | 1 | 1 | 0.5 | 2 | 2.5 | — | — | 0.5 | 5 | 5 | 2 | 5 | 5 | 5 |
| | 3 | 1 | 1 | 1 | 0.07 | 1 | 40 | 3 | 80 | — | — | 0.02 | 5 | 5 | 2 | 5 | 4 | 5 |
| | 4 | 3 | 0.02 | 1 | 90 | 2 | 1 | 4 | 0.02 | — | — | 10 | 5 | 5 | 2 | 4 | 4 | 5 |
| | 5 | 2 | 90 | 1 | 3 | 2 | 0.1 | 5 | 10 | — | — | 5 | 5 | 5 | 2 | 4 | 4 | 5 |
| | 6 | 4 | 5 | 2 | 0.5 | 2 | 10 | 6 | 3 | — | — | 90 | 5 | 5 | 2 | 4 | 4 | 5 |
| | 7 | 2 | 2.5 | 1 | 25 | 2 | 0.5 | 7 | 0.05 | — | — | 20 | 5 | 5 | 2 | 4 | 4 | 5 |
| | 8 | 1 | 2.5 | 1 | 5 | 1 | 5 | 8 | 50 | — | — | 0.5 | 5 | 5 | 2 | 4 | 4 | 5 |
| | 9 | 2 | 50 | 1 | 5 | 2 | 0.1 | 9 | 1 | — | — | 10 | 5 | 5 | 2 | 4 | 4 | 5 |
| | 10 | 1 | 5 | 1 | 0.1 | 1 | 0.2 | 10 | 5 | — | — | 2 | 5 | 5 | 2 | 4 | 4 | 5 |
| | 11 | 2 | 1.5 | 2 | 1 | 2 | 5 | 11 | 2.5 | — | — | 5 | 5 | 5 | 2 | 4 | 4 | 5 |
| | 12 | 1 | 2.5 | 1 | 0.5 | 4 | 5 | 12 | 1.5 | — | — | 2 | 5 | 5 | 2 | 4 | 4 | 5 |
| | 13 | 1 | 15 | 2 | 2.5 | 1+5 | 0.5+0.5 | 13 | 5 | — | — | 1.5 | 5 | 5 | 2 | 4 | 4 | 5 |
| | 14 | 2 | 10 | 1 | 1 | 1 | 5 | 14 | 30 | — | — | 0.5 | 5 | 5 | 2 | 4 | 4 | 5 |
| | 15 | 1 | 0.5 | 1 | 2 | 1 | 5 | 15 | 1.5 | — | — | 1.5 | 5 | 5 | 2 | 4 | 4 | 5 |
| | 16 | 1 | 0.05 | 1 | 0.5 | 1 | 5 | 16 | 0.5 | — | — | 0.5 | 5 | 5 | 2 | 4 | 4 | 5 |
| | 17 | 1 | 2.5 | 1 | 1 | 1 | 2.5 | 1 | 2.5 | PAA*1 | 1 | 0.5 | 5 | 5 | 5 | 4 | 4 | 5 |
| | 18 | 2 | 1 | 1 | 2.5 | 1 | 40 | 1 | 1 | PAA | 50 | 0.5 | 5 | 5 | 5 | 4 | 4 | 5 |
| | 19 | 1 | 1.5 | 1 | 2.5 | 1 | 2.5 | 1 | 2.5 | PMA*2 | 1 | 1 | 5 | 5 | 5 | 4 | 4 | 5 |
| | 20 | 2 | 5 | 1 | 5 | 1 | 40 | 2 | 1 | PMA | 50 | 1 | 5 | 5 | 4 | 4 | 4 | 5 |
| | 21 | 1 | 2.5 | 1 | 1 | 1 | 2.5 | — | — | PAA | 1 | 0.5 | 5 | 5 | 5 | 4 | 4 | 5 |
| | 22 | 2 | 1 | 1 | 2.5 | 1 | 40 | 2 | 2.5 | PAA | 50 | 1 | 5 | 5 | 5 | 4 | 4 | 5 |
| | 23 | 2 | 5 | 1 | 1 | 1 | 0.5 | 2 | 2.5 | PAA | 25 | 0.5 | 5 | 5 | 5 | 5 | 5 | 5 |
| | 24 | 2 | 5 | 1 | 1 | 1 | 0.5 | 2 | 2.5 | PMA | 25 | 0.5 | 5 | 5 | 3 | 4 | 4 | 5 |
| | 25 | 2 | 5 | 1 | 1 | 1 | 0.5 | 5 | 2.5 | PAA | 25 | 0.5 | 5 | 5 | 5 | 5 | 4 | 5 |
| Compar. Ex. | 1 | 1 | 200 | 1 | 200 | 1 | 100 | 5 | 120 | — | — | 120 | 1 | 1 | 2 | 4 | 3 | 2 |
| | 2 | 2 | 0.005 | 1 | 0.03 | 2 | 0.005 | 6 | 0.005 | — | — | 0.005 | 2 | 4 | 3 | 4 | 2 | 1 |
| | 3 | \multicolumn{11}{l}{Coating type chromating agent} | | | | | | | | 5 | 4 | 3 | 4 | 3 | 4 |

*1: Polyacrylic acid, Mw 100 × 10⁴
*2: Polymethacrylic acid, Mw 100 × 10⁴

Note) No. 23 and No. 24 are cases in which deep drawability was improved by adding acrylic resin to the highest performance formulation 2.

Examples 23 to 26

Treated sheets were prepared in the same manner as above and, in lieu of the primer coat and top coat, a fingerprint-proof coating as a kind of functional coating was applied using a bar coater #3 in a dry film thickness of 1 μm and dried at a metal surface temperature of 120° C. to fabricate testpieces. The results of evaluation of these test pieces are set forth in Table 2.

Examples 27 to 30

Treated sheets were prepared in the same manner as above and, in lieu of the primer coat and top coat, a lubricity coating as a kind of functional coating was applied using a bar coater #3 in a dry film thickness of 1 μm and dried at a metal surface temperature of 120° C. to fabricate testpieces. The results of evaluation of these testpieces are set forth in Table 2.

Comparative Example 4

In lieu of the metal surface-treating agent, a commercial coating-type chromating agent (resin-containing grade) was applied at a chromium deposition rate of 20 mg/m² and dried to prepare a testpiece in otherwise the same manner as in Example 27 and an evaluation was made similarly. The results of evaluation are set forth in Table 2.

[Silane Coupling Agent]
1: Sila-Ace S-330 (γ-aminopropyltriethoxysilane; Chisso Corporation)
2: Sila-Ace S0-510 (γ-glycidoxypropyltrimethoxysilane; Chisso Corporation)
3: Sila-Ace S-810 (γ-mercaptopropyltrimethoxysilane; Chisso Corporation)
4: Sila-Ace S-340 (N-(1,3-dimethylbutylidene)-3-(triethoxysilyl)-1-propanamine; Chisso Corporation)

[Water-Dispersible Silica]
1: Snowtex N (Nissan Chemical Ind.)
2: Snowtex O (Nissan Chemical Ind.)

[Zirconium compound]
1: Zircosol AC-7 (zirconyl ammonium carbonate; Daiichi Rare Elements Co.)
2: Ammonium zirconium fluoride (reagent),
3: Zirconium hydrofluoride (reagent)
4: Titanium hydrofluoride (reagent)
5: Ammonium titanium fluoride (reagent)

[Thiocarbonyl-containing compound]
1: Thiourea (reagent)
2: Ethylenethiourea (reagent)
3: Sodium diethylcarbamate (reagent)
4: 1,3-Diethyl-2-thiourea (reagent)
5: Zinc dimethyldithiocarbamate (reagent)
6: Zinc isopropylxanthate (reagent)
7: Dimethylxanthogen sulfide (reagent)

TABLE 2

| | | Metal surface treating agent formulation | | | | | | | | | |
|---|---|---|---|---|---|---|---|---|---|---|---|
| | | Coupling Agent | | Silica | | Zr compound | | Thiocarbonyl compound | | PO₄ | Acrylic resin |
| | No | Kind | g/l | Kind | g/l | Kind | g/l | Kind | g/l | g/l | PAA | PMA |
| Example | 23 | 1 | 2.5 | 1 | 1 | 1 | 2.5 | 1 | 5 | 1.25 | — | — |
| | 24 | 2 | 5 | 1 | 1 | 1 | 0.5 | 2 | 2.5 | 0.5 | 2.5 | — |
| | 25 | 1 | 1 | 1 | 2.5 | 1 | 5 | 3 | 1 | 0.02 | — | — |
| | 26 | 3 | 0.05 | 1 | 2.5 | 2 | 1 | 4 | 0.05 | 10 | — | 2.5 |
| | 27 | 1 | 2.5 | 1 | 1 | 1 | 2.5 | 1 | 5 | 1.25 | — | — |
| | 28 | 2 | 5 | 1 | 1 | 1 | 0.5 | 2 | 2.5 | 0.5 | 2.5 | — |
| | 29 | 1 | 1 | 1 | 2.5 | 1 | 5 | 3 | 1 | 0.02 | — | — |
| | 30 | 3 | 0.05 | 1 | 2.5 | 2 | 1 | 4 | 0.05 | 10 | — | 2.5 |
| Compar. Ex. | 4 | Coating type chromating agent | | | | | | | | | | |

| | | Coating adhesion | | Corrosion resistance (2) | | Fingerprint | |
|---|---|---|---|---|---|---|---|
| | No | Primary | Secondary | Processed surface | Flat surface | resistance | Lubricity |
| Example | 23 | 5 | 5 | 5 | 5 | 5 | Not evaluated |
| | 24 | 5 | 5 | 5 | 5 | 5 | Not evaluated |
| | 25 | 5 | 5 | 5 | 5 | 5 | Not evaluated |
| | 26 | 5 | 5 | 5 | 5 | 5 | Not evaluated |
| | 27 | 5 | 5 | 5 | 5 | Not evaluated | 5 |
| | 28 | 5 | 5 | 5 | 5 | Not evaluated | 5 |
| | 29 | 5 | 5 | 5 | 5 | Not evaluated | 5 |
| | 30 | 5 | 5 | 5 | 5 | Not evaluated | 5 |
| Compar. Ex. | 4 | 5 | 5 | 5 | 5 | 2 | 2 |

Referring to the silane coupling agent, water-dispersible silica, zirconium compound, titanium compound, thiocarbonyl-containing compound and acrylic resin mentioned in Tables 1 and 2 above, the following commercial products were used.

8: Tetramethylthiuram sulfide (reagent)
9: Sodium dimethyldithiocarbamate (reagent)
10: Sodium dibutyldithiocarbamate (reagent)
11: Tetrabutylthiuram disulfide (reagent).
12: Dipentamethylenethiuram tetrasulfide (reagent)

13: Zinc N-ethyl-N-phenyldithiocarbamate (reagent)
14: Piperidine pentamethylenedithiocarbamate (reagent)
15: Zinc dimethyldithiocarbamate (reagent)
16: Dibutylthiourea (reagent)
[Water-soluble acrylic resin]
1: Polyaqrylic acid (reagent), Mw 1,000,000
2: Polymethacrylic acid (reagent), Mw 1,000,000
<Methods of Evaluation>

In the evaluation of bending adhesion, deep drawability, corrosion resistance (1) and coin scratch resistance in the above Examples 1 to 22 and Comparative Examples 1 to 3 and the evaluation of coating adhesion and corrosion resistance (2) in the above Examples 23 to 30 and Comparative Example 4, the following methods and criteria were used.

Bending Adhesion
(Primary Adhesion)

The testpiece was bent through 180° (OTT) without interposition of a spacer in an environment controlled at 20° C. and the bent part was peeled using an adhesive tape 3 times. The degree of peeling was examined under a ×20 magnifying glass and rated on the following scale.

Score
5 points: no cracks
4 points: cracks all over the bend
3 points: the peeled area is less than 20% of the bend
2 points: the peeled area is not less than 20% and less than 80% of the bend
1 point: the peeled area is over 80% of the bend (Secondary Adhesion)

The testpiece was immersed in boiling water for 2 hours and, then, allowed to sit under indoor conditions for 24 hours. The testpiece thus treated was bent in the same manner as above and rated on the same scale as in the primary adhesion test.

Deep Drawability

A conical cup test was performed inman environment of 20° C. under the conditions of drawing ratio: 2.3, wrinkling restriction pressure: 2 t, punch R:5 mm, die shoulder R:5 mmn, and no grease. Then, the lateral surface of the testpiece was cross-cut and, after 1 hour of immersion in boiling water, the peeling distance of the film from the crosscut was measured. The following rating scale was used.

Score
5 points: width of blister <1 mm
4 points: width of blister >1 mm, <2 mm
3 points: width of blister >2 mm, <3 mm
2 points: width of blister >3 mm, <5 mm
1 point: width of blister >5 mm Corrosion Resistance (1)
(Cut Zone)

The testpiece was cross-cut and subjected to the same salt spray test according to JIS Z 2317 for 500 hours. The width of the blister formed on one side of the cutting line was measured and rated on the following scale.

Score
5 points: width of blister =0 mm
4 points: width of blister <1 mm
3 points: width of blister ≧1 mm, <3 mm
2 points: width of blister ≧3 mm, <5 mm
1 point: width of blister ≧5 mm (Edge)

The testpiece was subjected to a salt spray test as directed in JIS Z 2317 for 500 hours and the width of the blister formed along the upper burr edge was rated on the same scale as used for the cut zone.

Coin Scratch Resistance.

The testpiece was scratched under a load of 1 kg using a coin scratch tester and the injured part was evaluated on the following rating scale.

Score
5 points: exposed primer area <10%; base metal not exposed
4 points: exposed primer area ≧10% but <70%; base metal not exposed
3 points: exposed primer area ≧70%; exposed base metal area <30%,
2 points: exposed primer area >70%; exposed base metal area ≧30%, <70%
1 point: exposed primer area ≧70%; exposed base metal area ≧70%

Coating Adhesion
(Primary Adhesion)

Using a bar coater, the precoated steel sheets obtained in Examples 23 to 30 were coated with a melamine-alkyd resin coating (Kan-sai Paint, Amilac #1000) in a dry film thickness of 30 µm and dried by baking at an oven temperature of 130° C. for 20 minutes. The sheets were allowed to sit overnight and, then, processed to an Erichsen value of 7 mm. An adhesive tape (Nichiban; Cellotapem™) was applied to the processed area and quickly pulled off in an oblique direction of 45° C. The coating adhesion was evaluated on the following rating scale according to fractional (%) peel area.

5 points: no peeling
4 points: fractional peel area <5%
3 points: fractional peel area ≧5%, <30%
2 points: fractional peel area ≧30%, <50%
1 points: fractional peel area ≧50%

(Secondary Adhesion)

As in the primary adhesion test, the precoated sheets were coated with the melamine-alkyd resin coating and allowed to sit overnight. Then, each sheet was immersed in boiling water for 30 minutes and then processed to an Erichsen value of 7 mm. An adhesive tape (Nichiban; Cellotapem) was applied to the processed area and quickly pulled off in an oblique direction of 45°. Based on fractional peel area, the coating adhesion was evaluated on the following rating scale.

5 points: no peeling
4 points: fractional peel area <5%
3 points: fractional peel area ≧5%, <30%
2 points: fractional peel area ≧30%, <50%
1 points: fractional peel area ≧50%

Corrosion Resistance (2)
(Flat Area)

The precoated steel sheets obtained in Examples 23 to 30 were respectively sprayed with a 5% aqueous solution of NaCl in an ambient temperature of 35° C. in accordance with the salt spray test method directed in JIS Z2371, and the corrosion resistance was evaluated on the following rating scale according to the incidence of white rust formation after 240 hours.

5 points: no white rust
4 points: white rust <10%
3 points: white rust ≧10%, <20%
2 points: white rust ≧20%, <30%
1 points: white rust ≧30%

(Processed Part)

The precoated steel sheets obtained in Examples 23 to 30 were processed to an Erichsen value of 7 mm. Then, in accordance with the salt spray test method directed in JIS Z2371, each specimen was sprayed with a 5% aqueous solution of NaCl in an ambient temperature of 35° C. After 72 hours, the incidence of white rust in the processed area was evaluated on the following rating scale.

5 points: no white rust
4 points: white rust <10%

3 points: white rust ≧10%, <20%
2 points: white rust ≧20%, <30%
1 points: white rust ≧30%

Fingerprint Resistance

Using the precoated steel sheets obtained in Examples 23 to 26, finger impressions were made on the coated surface and the degree of conspicuousness of the resulting finger marks was evaluated on the following rating scale.

5 points: no discernible finger marks
4 points: slightly visible finger marks
3 points: visible finger marks
2 points: marked finger marks
1 points: prominent finger marks Lubricity Using a hydraulic forming test machine equipped with a conical punch, the precoated steel sheets obtained in Examples 27 to 30 were subjected to a forming test at room temperature under the following conditions and a lubricity evaluation was made using the degree of galling as an indicator.

Punch dia.: 70 mm φ
Blank dia.: 150 mm
Biasing load: 5 kgf/cm$^2$
Forming speed: $3.3 \times 10^{-2}$ m/s
Jig: FCD-500

Forming was invariably. carried out up to 80% of the maximum formable height. The degree of galling was macroscopically evaluated and the results were rated on the following scale.

5 points: formable, no steel surface flaw
4 points: formable, no steel surface defect, a slight tarnish on sliding surface
3 points: formable, a few galling marks on steel surface
2 points: formable, many linear galling marks on steel surface
1 points: not formable

What is claimed is:

1. A non-chromate metallic surface-treating agent which comprises, in each liter thereof,
    (a) 0.01 to 100 g/l of a silane coupling agent and/or a hydrolytic condensation product thereof,
    (b) 0.05 to 100 g/l of water-dispersible silica (as solids), and
    (c) 0.01 to 50 g/l, in terms of Zr ion, of a zirconium compound and/or 0.01 to 50 g/l, in terms of Ti ion, of a titanium compound, said surface-treating agent further comprising
    (d) 0.01 to 100 g/l of a thiocarbonyl-containing compound, and/or
    (e) 0.1 to 100 g/l of a water-soluble acrylic resin.

2. The nonchromate metallic surface-treating agent according to claim 1
    which comprises 0.01 to 100 g/l of phosphate ion.

3. A method of treating a metallic surface which comprises treating a surface of a steel material with the metallic surface-treating agent according to claim 1 or 2.

4. The method of treating a metallic surface according to claim 3
    wherein the steel material is a metal-coated steel material.

5. A surface-treated steel material which is obtained by the method according to claim 3.

6. A surface-treated metal-coated steel material which is obtained by the method according to claim 4.

7. A method of producing a coated steel material which comprises treating a surface of a metal-coated steel material with the metallic surface-treating agent according to claim 1 or 2 and, then, applying a top coat thereon.

8. A coated steel material which is obtained by the method according to claim 7.

* * * * *